Patented Apr. 2, 1946

2,397,564

UNITED STATES PATENT OFFICE 2,397,564

PEANUT BUTTER AND PROCESS OF MANUFACTURING THE SAME

Joseph L. Rosefield, Jerome M. Rosefield, and Marvin Rosefield, Alameda, Calif.

No Drawing. Application October 7, 1942, Serial No. 461,158

10 Claims. (Cl. 99—128)

The invention, in general, relates to methods of manufacturing nut butters as well as other emulsified products both edible and inedible. More particularly, the invention relates to an improved process especially efficacious for producing a highly stable, emulsified peanut butter having enriched nutritive value.

While the hereinafter described process is entirely suitable for manufacturing a variety of stabilized emulsions, edible or otherwise, the process has been especially applied to the production of peanut butter and we shall, accordingly, describe the improved methods and products in that environment.

It is perhaps well recognized that many of the peanut butters currently marketed in this country have a number of disadvantageous properties or attributes which, in addition to rendering them somewhat unsightly and even difficult to spread, are often so unstable as to become unpalatable in relatively short periods of time and even inedible or unfit for human consumption. As is probably well known, many peanut butters are of such a character that the oil separates from the solids in appreciably short periods of time; others are relatively sticky and adhere not only to the walls of the container but also to the roof of the mouth; others oxidize rapidly and become rancid; while still others have a tendency to drop out the salt and other added ingredients and thus reduce not only the salability of the product but also the nutritive value thereof.

A primary object of our invention is to provide an improved peanut butter which is characterized by its high degree of lasting stability in emulsified state with substantially no separation of the oils of the butter from the solids for appreciable periods of time.

Another object of our present invention is to provide an improved peanut butter of the indicated nature which is additionally characterized by its freedom from stickiness.

A still further object of the present invention is to provide an improved nut butter or other stable emulsion, edible or inedible, which possesses the property of retarding rancidity.

Another object of our invention is to provide an improved peanut butter and process of manufacturing the same which affords a product of enhanced nutritive value.

Another object of the invention is to provide an improved peanut butter and process of making the same which particularly promotes the digestibility of the product.

A still further object of our present invention is to provide an improved process of the indicated nature which affords the utilization of peanuts having less than normal oil content and the production therefrom of an enhanced nutritive value peanut butter.

Another object of the present invention is to provide an improved process of the indicated nature which is additionally characterized by its economy of operation as well as the reduction of plant costs to a minimum.

The foregoing and other objects are attained in a preferred and certain modified modes of carrying out the process for producing preferred and modified embodiments of our improved nut butters. It is to be understood that we are not to be limited to the precise methods set forth nor the precise order of steps or stages of the several processes described, nor to the precise embodiments set forth, as our invention, as defined in the appended claims, can be carried out in a plurality and variety of ways to produce a plurality and variety of embodiments.

In its preferred mode, the process of manufacturing improved nut butters of our invention preferably comprises the step of incorporating a wetting agent in a mass of comminuted nuts during the manufacture of the nut butters. As exemplified in a nut butter, our invention comprises, in its preferred form, a substantially inadhesive homogeneous mass of comminuted nuts containing a wetting agent.

The hereinafter described processes are applicable to all of the processes and products described and claimed in Letters Patents Nos. Re. 15,918; 1,528,077; 1,716,152; and 1,756,702, granted to one of the present applicants, and the processes and products described and claimed therein are incorporated herein by reference.

Before alluding to the preferred and modified modes of carrying out our improved process of manufacturing our preferred products, together with modifications thereof, we direct especial attention to the fact that the present invention is adapted to be utilized in the manufacture of regular peanut butters, the hydrogenated types of peanut butters, the so-called "chunk" styles of ordinary peanut butter, and in the production of other nut butters as well as inedible emulsions of various kinds.

A preferred form of our improved peanut butter is manufactured by first carrying out the customary steps of preparing peanut butters which include the initial steps of roasting shelled peanuts, cooling and blanching the roasted peanuts, and then grinding or comminuting the same. In accordance with our invention, we introduce into the mass of comminuted peanuts, either before or after adding thereto desired flavoring agents such as salt, sugar, chocolate etc., etc., a wetting agent that may be taken from a hydrocarbon group whose molecular structure is made up of long and short chains of varying lengths including two radicals attached to one metallic atom and which constitute, per se, water-in-oil emulsifying agents since one chain group of these types of agents readily combines with water and the other chain is free to attach itself to oil. In this group are the sulphonated oils, and we may utilize from this group the product known as "physterol." In addition to the foregoing compounds, we have found that a variety of natural products possess the desirable wetting characteristics and among this group are lecithin, an aqueous solution of egg yolks, or magnesium oleate as well as calcium oleate derived from milk solids. In our preferred and modified processes hereinafter described, we preferably employ lecithin as the wetting agent and preferably disperse the same in an aqueous solution although this is not essential. If magnesium or calcium oleate be employed as the wetting agent, in lieu of lecithin, it is recommended that a freshly precipitated specimen of such wetting agents be utilized since the stability of the resultant emulsion as well as the ease of emulsification are otherwise sharply affected. Moreover, before using aqueous solutions of freshly precipitated magnesium or calcium oleate the water should be put on the alkaline side for we have found that the hydrogen ion activity of the water with the oil of the butter definitely affects the stability of the emulsions. We also have found that the pH number of these aqueous dispersions of magnesium and calcium oleates can only vary within relatively narrow limits otherwise the stability of the emulsion will be adversely affected. Preferably, sodium hydroxide is used to effect the alkalinity of the aqueous dispersions of these wetting agents. In practicing our present invention, we have found that an electrometrical indicated pH of from 11.0 to 12.5 will give an emulsion that is stable for approximately eight months, more or less. In addition to their essential or dominating wetting characteristic, the above mentioned wetting agents possess the property of preventing or overcoming flotation of the released oil from the peanuts in the step of grinding the same or act, in effect, as deflocculation agents.

In practicing our improved process for producing a stable emulsion of a non-sticky, regular peanut butter of enhanced nutritive value, we follow initially the customary steps of roasting shelled peanuts, cooling and blanching the same, and thereafter reduce the roasted, cooled and blanched peanuts by means of a suitable mill to a homogeneous mass of comminuted peanuts. After the regular peanuts have been suitably ground they are preferably placed in a mixing kettle and we then add to the mass a wetting agent of the character above described, preferably lecithin. Since considerable of the original moisture content of the peanuts is driven off in the roasting operation, we preferably place the lecithin in an aqueous dispersion, as above outlined, before introducing the same into the kettle containing the homogeneous mass of comminuted peanuts and thereby return not only substantially all of the original moisture content but also provide an admirable medium for combining with the free oil liberated from the peanuts in the grinding operation. However, if desired, the wetting agent can be first combined with an edible oil, fat, grease or wax before adding the same to the mass of comminuted peanuts. The mass of peanuts with the added wetting agent is thoroughly mixed until a substantially inadhesive plastic emulsion of peanut butter is attained and the wetting agent has combined with the free oil of the peanuts, thus providing a product which promotes digestibility since it is more assimilable by the gastric juices of the mouth and stomach. While the mass is still in the mixing kettle, we add desirable flavoring agents, such as salt, sugar, chocolate or the like, and we preferably then further reduce the resultant mixture by re-grinding the same in a suitable mill, or reduce the same by homogenizing, colloiding or by any other suitable method of refining. It may be observed here that in producing our improved regular peanut butter with its contained wetting agent, the nibs can be removed or can be allowed to remain, and hand picking is optional. Of course, if the product is not for human consumption, it is not essential that the oil, fat, wax or grease which might be combined with the wetting agent, be edible.

The foregoing steps can be modified, whenever desired, to produce the so-called "chunk" style of peanut butter with contained lecithin or other wetting agent. This modification only requires the addition of kernels of peanuts or other nuts after final grinding. A further modification of the regular peanut butter with contained wetting agent can be produced by the addition to the mass after the final grind, broken bits of chocolate, candies, fruits etc., etc., to provide varieties of nut butters all having increased stability due to the presence therein of the incorporated wetting agent.

A modified embodiment of our improved peanut butter comprises a product prepared by introducing a wetting agent of the character described into a mass of roasted blanched peanuts which have been cut or sliced in such a manner as to avoid crushing the oil cells, and to which has been added an edible oil, such as cocoanut oil, or an edible fat; all as described and claimed in Letters Patent Nos. 1,716,152 and 1,528,077, above mentioned. If desired, the wetting agent, per se, can be introduced separately into the mass of the aforesaid peanuts or the lecithin, or other wetting agent, can be mixed with an edible oil, fat, grease or wax prior to incorporating the same with the mass of peanuts.

A further modification of the present invention consists in the utilization of lecithin or other wetting agent in one stage of the method of producing the product described and claimed in Letters Patent No. Re. 15,918 wherein there is disclosed the process of removing a portion of the oil from the nut meat, hydrogenating the removed oil, and then reincorporating the hydrogenated oil in the mass from which the oil has been removed. The hydrogenated peanut butter now marketed embraces the steps of roasting shelled peanuts, cooling and blanching the same, removing the nibs, hand picking, pressing a portion of the oil from the thus prepared peanuts, then filtering, neutralizing and hydrogenating the removed or pressed out oil, grinding the cake of the peanuts after the oil has been extracted, re-incorporating the hydrogenated oil in the ground cake, mixing in desirable flavoring agents such as salt, sugar and the like, and then re-grinding, homogenizing, colloiding or otherwise reducing the mass. In our improved process, the lecithin or other wetting agent can be introduced separately and directly into the ground cake from which the oil has been extracted, as aforesaid, and the filtered, neutralized and hydrogenated oil thereafter reincorporated into the mass, or the lecithin can be mixed with the hydrogenated oil prior to incorporating the mixture into the mass or ground cake; or the wetting agent can be added to a mixture of the ground cake of peanuts and the hydrogenated oil. If desired, the hydrogenation of the oil can be dispensed with and lecithin or other wetting agent, dispersed in an aqueous solution that has a pH number as aforesaid, can be combined and introduced into the mass with a non-hydrogenated or natural edible oil, fat, grease or wax. It should be noted that all of the modifications described above with respect to regular peanut butter, such as the "chunk" style or the variety containing broken bits of chocolate, candies and the like, can be produced in accordance with the modified method hereinabove just described and relating to the reincorporation of an hydrogenated oil into a mass of ground peanuts from which the oil has been removed. It follows also that this last mentioned modification can include the steps of pressing the oil from the removed nibs, and the addition of such nibs-extracted oil to the mass.

A still further modified product and modified process of manufacture thereof consists of initially following the customary steps of roasting shelled peanuts, cooling and blanching the same, removing the nibs and hand picking, if desired, and then pressing out a portion of the oil from the thus prepared peanut mass by any suitable means, such as a hydraulic, an expeller, a vacuum filter or by chemical extraction. The oil also is extracted from the residual nibs and added to the oil taken from the remainder of the pressed peanut mass. The expressed oil, together with the oil extracted from the nibs, is then filtered, neutralized and hydrogenated. In accordance with this modification of our process, the peanut cake from which the oil has been extracted is given a preliminary grinding and placed in a mixing kettle, preferably jacketed, and the ground cake, together with the hydrogenated oil and an aqueous dispersion of a wetting agent, such as lecithin, as well as desired flavoring agents, such as salt, sugar, etc., etc., are thoroughly mixed together in the kettle. The resultant mixture is then reduced by re-grinding, homogenizing or colloiding, or by other suitable methods of refining. Modifications of the foregoing resultant nut emulsion can be produced as before by incorporating therein kernels of nuts, candies, fruits and the like, although such added ingredients should be incorporated into the mass after the final reduction regardless of whether the final grind is before or after the mixing operation.

Somewhat the same efficacious nut butter emulsions possessing the same high degree of stability can be obtained by the use of deflocculation agents in lieu of the wetting agents hereinabove described, although it should be recognized that deflocculation agents are of more limited scope than the wetting agents. It is known that deflocculation agents have similar wetting characteristics but it appears that true deflocculation should be considered as the neutralization of the stray field of an unsaturated force radiating from a dispersed particle by an adsorbed film, and whatever wetting characteristics a given deflocculation possesses are probably in consequence of the adsorption of a molecule highly soluble in an inert diluent low in cohesion character. Air blown oils, particularly cocoa butter, have been found especially adaptable deflocculation agents in the present process, although any other suitable, non-toxic agents of this group can be utilized for emulsion products for human consumption, while toxic deflocculation agents can, of course, be employed in the final product is not for human consumption.

While the above described processes have been directed to the production of peanut butters, it is to be understood that nut butters can be effectively prepared in accordance with the foregoing processes utilizing walnuts, almonds or other nuts, as well as employing any oil bearing food, such as soya beans, as the basic ingredient. The incorporation of one of the above mentioned wetting agents, or a deflocculation agent, into a homogeneous mass of any one of the foregoing comminuted nuts, or ground oil bearing foods, will produce highly stable emulsions entirely suitable as spreads.

The foregoing preferred and modified modes of carrying out our improved processes of manufacturing nut butters and spreads make possible for the first time the returning of moisture to substantially the same extent as the original moisture content of the nuts and in an efficacious manner so as positively to inhibit stickiness. In addition, this feature of our present invention affords sufficient moisture for combining with the free oil of the peanuts and provides a highly stable emulsion from which the oil will not separate out for appreciable periods of time. The addition of the wetting agent effectively returns to the peanuts substantially all of the original moisture content thereof which is driven off in the roasting step in all processes of producing peanut butter. Normally, and because of this loss of moisture as a result of roasting, there is insufficient moisture in many of the peanut butters currently marketed to dissolve the added salt which rapidly settles out leaving the butter in an unsightly and unsalable condition. This disadvantage is obviated in our improved peanut butters as a result of the added moisture which dissolves the added salt effectively and no separation thereof from the peanut butter occurs. It may be observed further that our improved process makes possible the restoration to the peanut butter of oil pressed from the nibs, this feature being commercially valuable in that it affords salvaging of some value from the nibs which heretofore have been discarded and, in addition, provides a peanut butter of high nutritive value bringing its oil content to substantially its original oil content. Moreover, it has now been made possible, as a result of the herein described improvements, to process such oil deficient peanuts as Virginia peanuts and to produce therefrom a highly efficacious peanut butter with a much better balanced oil content.

It is to be understood that the appended claims are to be accorded a range of equivalents commensurate in scope with the advance made over the prior art.

We claim:

1. A substantially inadhesive plastic nut butter comprising a homogeneous mass of comminuted nuts containing an aqueous dispersion of a wetting agent.

2. A substantially inadhesive stable emulsion of nut butter comprising a homogeneous mass of comminuted nuts containing an aqueous dispersion of a wetting agent combined with an edible oil or fat or wax.

3. A substantially inadhesive stable emulsified stock feed comprising a homogeneous mass of comminuted nuts containing an aqueous dispersion of a wetting agent combined with an inedible oil.

4. A process of manufacturing peanut butter, said process comprising the steps of roasting shelled peanuts, cooling and blanching the same, grinding the roasted, cooled and blanched peanuts to provide a homogeneous mass of comminuted peanuts, mixing into said mass of comminuted peanuts an aqueous dispersion of a wetting agent to provide a stable emulsion, adding a flavoring agent to the mixture, and then regrinding the resultant mixture.

5. A process of manufacturing a peanut butter, said process comprising the steps of roasting shelled peanuts, cooling and blanching the same, grinding the roasted, cooled and blanched peanuts to provide a homogeneous mass of comminuted peanuts, and then mixing with the comminuted peanuts an aqueous dispersion of a wetting agent combined with an edible oil, fat, grease or wax.

6. A process of producing a stable emulsion of peanut butter, said process comprising the step of incorporating a composition of an aqueous dispersion of a wetting agent and an edible oil, fat, grease or wax into the butter during the manufacture thereof.

7. A process of producing peanut butter, said process comprising the steps of roasting shelled peanuts, cooling and blanching the same, expressing a portion of the oil from the peanuts, filtering, neutralizing and hydrogenating the expressed oil, grinding the peanut cake from which the oil has been expressed, combining an aqueous dispersion of a wetting agent with the hydrogenated oil, and then mixing the combination of hydrogenated oil and aqueous dispersion of wetting agent into the ground peanut cake.

8. A process as defined in claim 7, including the step of removing the nibs from the peanuts, expressing the oil from the removed nibs, filtering the extracted oil and adding the extracted oil to the oil expressed from the remainder of the peanuts, hydrogenating the oil, and then adding the same together with the aqueous dispersion of wetting agent to the ground cake of peanuts from which the oil had been expressed.

9. A process of manufacturing a substantially inadhesive peanut butter emulsion, said process comprising incorporating an aqueous dispersion of lecithin into the butter during the manufacture thereof.

10. A substantially inadhesive nut meat consisting of a nut meat cut into small particles some of the cells of which are severed but otherwise intact and the majority of the oil content retained in the cells, in combination with an aqueous dispersion of a wetting agent and an edible oil, fat, grease or wax having the properties of affording a stable, emulsified plastic product.

JOSEPH L. ROSEFIELD.
JEROME M. ROSEFIELD.
MARVIN ROSEFIELD.